J. L. GUIMARÃES.
COFFEE MAKING APPARATUS.
APPLICATION FILED JULY 7, 1916.
1,247,396.
Patented Nov. 20, 1917.
2 SHEETS—SHEET 1.
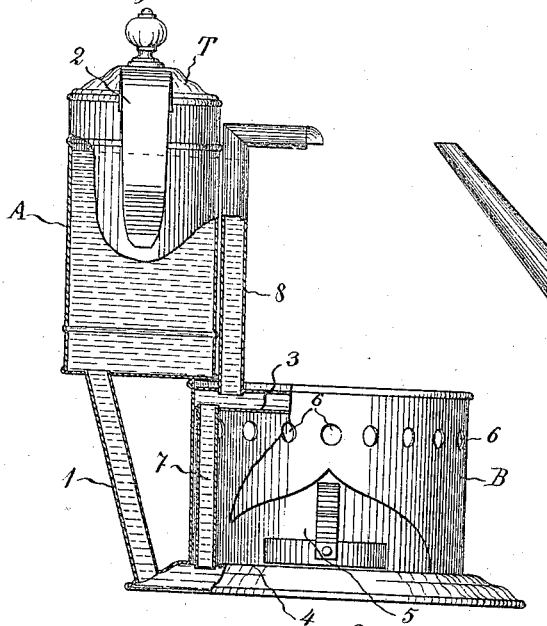
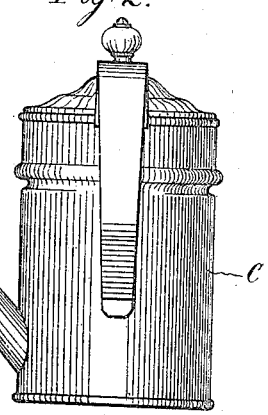
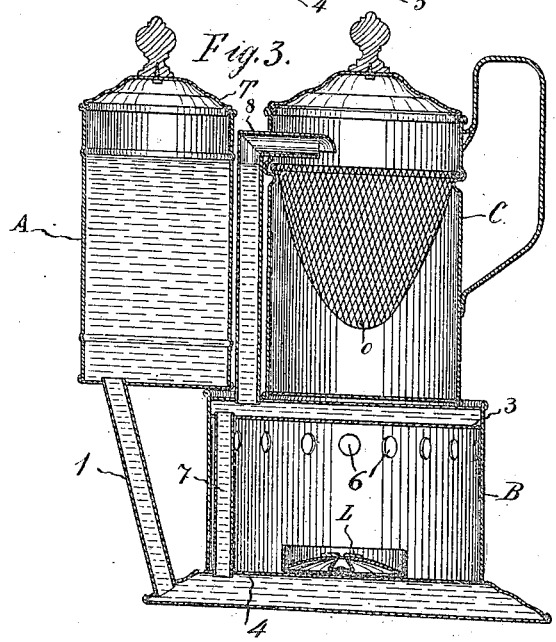
INVENTOR
José Lopes Guimarães
BY
ATTORNEYS J. L. GUIMARÃES.
COFFEE MAKING APPARATUS.
APPLICATION FILED JULY 7, 1916.
1,247,396.
Patented Nov. 20, 1917.
2 SHEETS—SHEET 2.
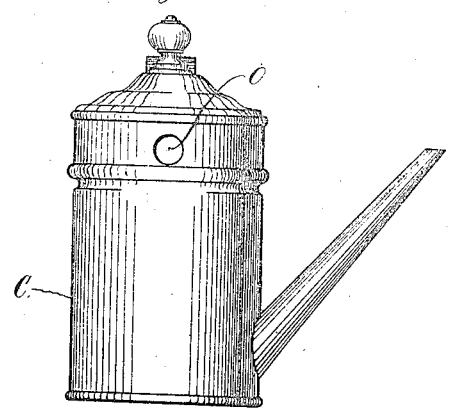
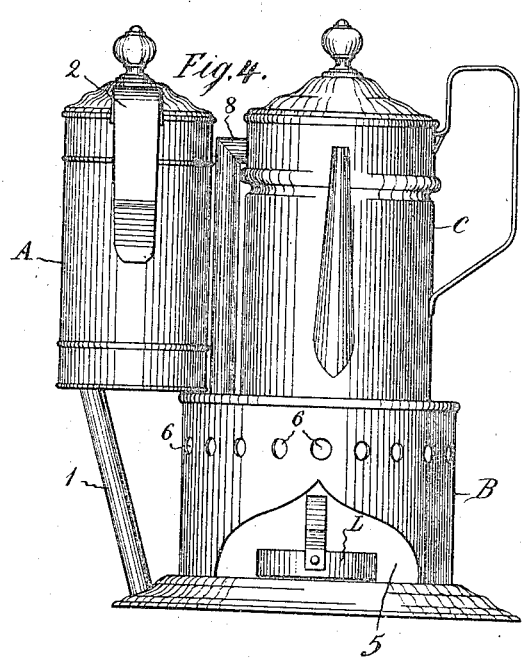
INVENTOR
José Lopes Guimarães
BY
ATTORNEYS

UNITED STATES PATENT OFFICE.

JOSÉ LOPES GUIMARÃES, OF RIO DE JANERIO, BRAZIL, ASSIGNOR TO JOSÉ LOPES GUIMARÃES & CO., OF RIO DE JANEIRO, BRAZIL.

COFFEE-MAKING APPARATUS.

1,247,396.  Specification of Letters Patent.  Patented Nov. 20, 1917.

Application filed July 7, 1916. Serial No. 108,007.

*To all whom it may concern:*

Be it known that I, José Lopes Guimarães, a citizen of Brazil, and a resident of Rio de Janeiro, Brazil, have invented new and useful Improvements in Coffee-Making Apparatus, of which the following is a full, clear, and exact description.

My invention relates to a contrivance for making and serving coffee and similar infusions. An object of the invention is to provide a simple and efficient apparatus adapted for use with a burner located within the body of the apparatus or outside.

I attain the above and other objects of my invention by the structure conventionally disclosed in the accompanying drawings, wherein similar characters of reference indicate corresponding parts in all the views.

Figure 1 is an elevation of my apparatus, the coffee-pot being removed and certain parts being shown in section to show the details of construction;

Fig. 2 is a side elevation of the coffee-pot;

Fig. 3 is a section through the apparatus and coffee-pot thereon;

Fig. 4 is an elevation of the apparatus *ensemble;* and

Fig. 5 is a side elevation of the pot when seen from the side opposite the handle.

Referring to the drawings, A is the water receptacle provided with a cover T and supported by a boiler B to one side thereof and connected thereto by a tube 1 extending from the bottom of the receptacle to the lower compartment 4 of the boiler. The receptacle A and the boiler B are united and can be moved simultaneously by means of the handle 2 provided on the receptacle A. The upper compartment 3 of the boiler B is spaced from the compartment 4, and with which it is in communication by a tube 7. In the space between the upper compartment 3 and the lower compartment 4 of the boiler a burner L can be introduced through a suitable opening 5 provided in the boiler. The boiler has apertures 6 in proximity to the upper compartment 3 through which the combustion gases of the burner are free to escape.

A tube 8 rises from the compartment 3 of the boiler B. Its upper end is bent laterally to engage an opening O formed in the coffee-pot C when same is resting on the boiler. The extremity of the laterally-bent tube portion is provided with a baffle so as to discharge into the strainer C provided in the coffee-pot.

It will be noted that the heat supplied to the boiler, whether by a burner placed within or directly to the lower compartment, will also heat the coffee-pot and maintain the infusion therein hot.

I claim:

1. An apparatus of the character described, comprising a boiler having a flat top and provided with upper and lower communicating water chambers, spaced to form a burner chamber between them, and an upwardly extending pipe leading from the upper water chamber and having a laterally extending upper end, a water receptacle secured to the boiler and having a tube leading from its bottom to the lower water chamber of the boiler, and a removable coffee pot on the boiler and having at its upper end an opening into which the end of the tube of the boiler extends.

2. In an apparatus of the character described, a boiler having a flat top and provided at its top and bottom with communicating water chambers, spaced to form a burner chamber between them, and a pipe leading from the upper water chamber adjacent one side of the top thereof and having a laterally extending upper end adapted to enter a coffee pot, when the same is on the boiler, the burner chamber having an opening in its lower portion and a plurality of openings in its upper portion, and a water receptacle secured to the top of the boiler adjacent its pipe and having a pipe leading from its bottom to the lower water chamber of the boiler.

JOSÉ LOPES GUIMARÃES.

Witnesses:
  Alvaro de Castro Carvalho,
  Sydo Tavary de Chreviz.

Copies of this patent may be obtained for five cents each, by addressing the "Commissioner of Patents, Washington, D. C."